United States Patent
Simmons et al.

[11] Patent Number: 5,224,770
[45] Date of Patent: Jul. 6, 1993

[54] LIGHT BOX

[75] Inventors: Adrian Simmons, Kaarst, Fed. Rep. of Germany; Alberto de la Cruz Garcia, Tres Cantos, Spain; Roberto Casalone, Aosta, Italy

[73] Assignee: Minnesota Mining and Manufacturing Company, St. Paul, Minn.

[21] Appl. No.: 803,179

[22] Filed: Dec. 5, 1991

[30] Foreign Application Priority Data

Dec. 8, 1990 [DE] Fed. Rep. of Germany ....... 4039291

[51] Int. Cl.$^5$ .................... G01D 11/28; F21V 9/02
[52] U.S. Cl. ........................... 362/29; 362/260; 362/328; 362/329; 362/339; 362/347
[58] Field of Search ............... 362/29, 30, 217, 223, 362/260, 299, 300, 306, 309, 310, 327, 328, 329, 330, 339, 340, 347; 359/49

[56] References Cited

U.S. PATENT DOCUMENTS

| | | | |
|---|---|---|---|
| 2,175,067 | 10/1939 | Rolph | 240/106 |
| 2,290,282 | 7/1942 | Herr | 362/260 |
| 2,348,617 | 5/1944 | Furedy | 362/217 |
| 3,944,807 | 3/1976 | Frantti et al. | 362/217 |
| 4,120,565 | 10/1978 | Rabl et al. | 350/286 |
| 4,154,219 | 5/1979 | Gupta et al. | 126/270 |
| 4,233,651 | 11/1980 | Fabbri | 362/330 |
| 4,260,220 | 4/1981 | Whitehead | 350/96.28 |
| 4,615,579 | 10/1986 | Whitehead | 350/96.1 |
| 4,791,540 | 12/1988 | Dreyer, Jr. et al. | 362/331 |
| 4,805,984 | 2/1989 | Cobb, Jr. | 350/96.28 |
| 4,834,495 | 5/1989 | Whitehead et al. | 350/96.28 |
| 4,850,665 | 7/1989 | Whitehead | 350/96.1 |
| 4,874,228 | 10/1989 | Aho et al. | 350/345 |
| 4,874,228 | 10/1989 | Aho et al. | 362/327 |
| 4,906,070 | 3/1990 | Cobb, Jr. | 350/286 |
| 5,006,966 | 4/1991 | Mikalonis | 362/310 |
| 5,029,060 | 7/1991 | Aho et al. | 362/329 |
| 5,034,864 | 7/1991 | Oe et al. | 362/329 |
| 5,054,885 | 10/1991 | Melby | 362/348 |

FOREIGN PATENT DOCUMENTS

| | | |
|---|---|---|
| 0395344A3 | 10/1990 | European Pat. Off. |
| 3806421A1 | 11/1988 | Fed. Rep. of Germany |
| 2331854 | 6/1977 | France |
| 0447687 | 4/1949 | Italy ................ 362/347 |
| 0024906 | 1/1990 | Japan ............... 362/260 |

*Primary Examiner*—Ira S. Lazarus
*Assistant Examiner*—Y. Quach
*Attorney, Agent, or Firm*—Gary L. Griswold; Walter N. Kirn; Stephen W. Buckingham

[57] ABSTRACT

The light box is provided with a case having arranged therein a reflector directed to the front wall to be illuminated from the rear. The reflector surface has a concave curvature. An elongated light source is arranged in the center of the case. The reflector, in the central area thereof, is covered by an optical film having a structured surface directed to the light source. This structure consists of immediately adjacent V-shaped grooves, being parallel to each other and running transverse to the extension of the light source. By total reflection on the structured surface of the transparent optical film as well as by reflection on the reflector surface of the reflector, the light of the light source incident on the reflector is reflected in the direction of the back-lit front side of the light box. This arrangement provides for improved and more-uniform light distribution.

13 Claims, 1 Drawing Sheet

U.S. Patent        July 6, 1993        5,224,770
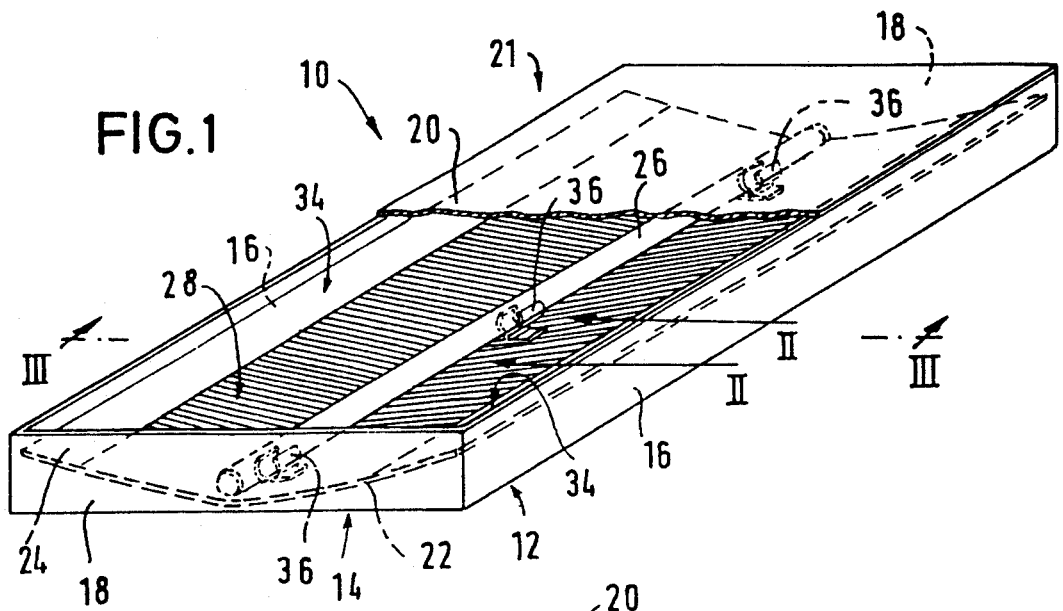
FIG.1
FIG.2
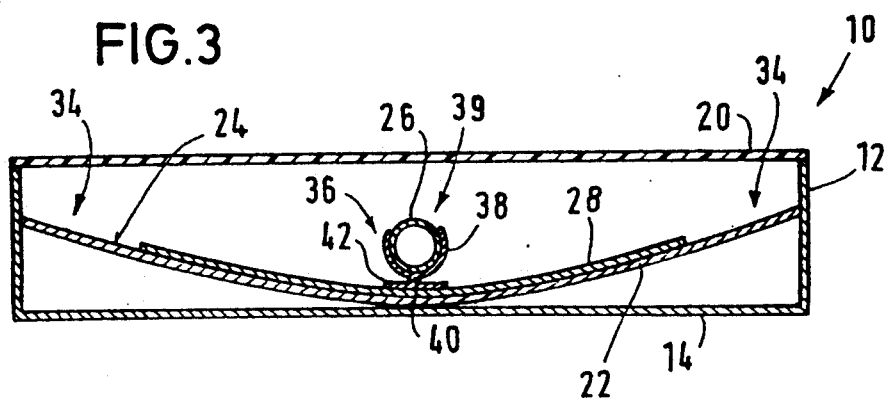
FIG.3

LIGHT BOX

The invention is directed to a light box having a case with a back-lit front side, a light source for backlighting said front side, and a reflector with a curved reflector surface having provided thereon an optical film, said film, on the surface thereof directed towards the light source, being provided with substantially V-shaped grooves arranged side by side and in parallel to each other.

The main problem with light boxes consists in that the front side or wall, carrying a signing, i.e. information, has to be illuminated evenly although a plurality of point sources of light or elongated sources of light (luminescent or fluorescent tubes) are used. Light boxes are installed wherever an information-carrying surface is to be back-lit by light. Therefore, light boxes are used primarily for back-lit posters, pictures, sign plates and the like. However, light boxes find also application as working place luminaries because they emit the light relatively evenly onto the working place. Further, light boxes are used for the backlighting of liquid crystal displays.

A light box of the initially mentioned type is known from U.S. Pat. No. 4,874,228. This known light box comprises a box substantially rectangular in section, with a (elongated) light source being arranged in one peripheral area of said box. Between the rear wall and the back-lit front side of the box opposite to the rear wall, there is arranged a reflector, having a reflector surface with a transparent optical film arranged thereon. Said optical film has an even surface showing towards the reflector surface and a structured surface provided with a plurality of substantially V-shaped grooves arranged side by side and in parallel to each other, i.e. a plurality of prisms arranged without mutual distances. Transparent optical films of this kind are also used for light transmission in air. In said known light box, the prisms or grooves run parallel to the extension of the light source, i.e. parallel to the tube. Depending on the respective angle of incidence, the beams incident on the structured surface of the optical film, traveling at relatively small angles of less than 20 degrees with respect to the even surface of the optical film, are either (totally) reflected or, while being refracted, penetrate into the optical film and are reflected on the reflector surface and then, after again penetrating the optical film, exit in the direction of the front side to be back-lit. The reflector, and thus also the optical film, does not extend in the immediate vicinity of the light source, i.e. is not arranged in the region near the light source.

It is the object of the invention to provide a light box of initially-mentioned type which, while being simple in construction, provides almost completely even illumination of the front side.

For solving said object, it is provided according to the invention that the light source is arranged in the central area of the reflector and that the V-shaped grooves are oriented transverse to the extension of the light source.

In the light box of the invention, the reflector is arranged along both longitudinal sides of the elongated light source; thus, the reflector surface projects beyond the light source transverse to the longitudinal extension thereof. Accordingly, the light source is located in the central area of the reflector. The orientation or structure, respectively of the optical film on the reflector surface is such that the grooves or prisms run vertical to the longitudinal extension of the light source. The light beams, traveling in a relatively large range of angles of some 10 degrees to 90 degrees with respect to the even surface of the optical film, impinge on the structured surface thereof. The reflector (optical film) is curved and preferably has a varying radius of curvature.

From the upper region of the light source, facing the front side, light is emitted directly onto the back-lit front side whereas from the lower region of the light source, being averted from the front side, light impinges onto the optical film of the reflector. Due to the orientation of the V-shaped grooves (or prisms), the light beams incident on the reflector are defracted in such a manner that they impinge on the front side after traveling past the side of the light source, i.e. without crossing it. The light beams emitted by the light source from the lower region thereof hit onto the oblique flanks of the V-shaped grooves or prisms where they are either reflected completely or, after being refracted, penetrate into the optical film and are reflected by the underlying reflector surface. By the structure of the optical film being oriented transverse to the extension of the light source, it is accomplished that those light beams which impinge on the reflector immediately near the light source are reflected past the side of the light source onto the front side and, therefore, do not add to the light aimed directly from the light source to the front side. As a result, there is provided a more uniform illumination of the front side in the central area thereof where the light from the light source impinges directly thereonto. This is particularly advantageous in flat light boxes since, due to the closeness of the front side to the light source, the front side tends to be illuminated more intensely in the area of the light source. This effect is evidently reduced in the light box of the invention.

The optical film is flexible but is provided with some stability of shape, i.e. a certain bending resistance. Thus, the optical film substantially maintains its form and position when not being subjected to external forces.

Basically, it is without relevance at which angle the flanks of the V-shaped grooves extend with respect to each other. Particularly favorable optical characteristics are obtained if the flanks of the optical film are oriented at a mutual angle of 90 degrees, with each flank arranged at an angle of 45 degrees relative to the even underside of the film. Preferably, the total thickness of the optical film is about 0.5 mm, the depth of the V-shaped grooves being about 0.17 mm and the width of the opening thereof being about 0.35 mm, respectively. Preferably, the material of the optical film consists of polycarbonate or polymethylmethacrylate.

Preferably, an elongated lamp, particularly a fluorescent tube, is used as a light source. However, also a string of point sources of light is suitable. In the sense of the invention, an elongated light source is any light source with strip-shaped light radiation. Fluorescent tubes offer the advantage that light is emitted not just radially, as in a luminous filament, but (with the tube being seen from the side) from a relatively wide area of the strip, namely the area of the longitudinal section of the tube. Thereby, the angles of incidence of the light beams are equal or substantially equal over wide areas of the reflector, resulting in equal or similar reflections. Thus, a light source emitting light out of different distances to the reflector, as is the case with a tube, illuminates the reflector in a more uniform manner than a light source comprising a luminous filament. A more uniform illumination of the reflector, in turn, contributes to a more uniform illumination of the front side.

Advantageously, the reflector surface under the optical film is provided for diffuse reflection; particularly, this surface is a mat white surface. On the surface, the portion of light entering into the optical film (depending on the angle of incidence of the light beams) is reflected diffusely, i.e. with a certain scattering or spreading. Preferably, the peripheral areas of the reflector, extending in parallel to the longitudinal dimension of the light source, are not covered by the optical film but are exposed. These peripheral areas reflect the light diffusely and thus add to the spreading of the light in the peripheral area of the front side.

Preferably, the light source is arranged in the immediate vicinity of the structured surface of the optical film, e.g. in a distance of about 5 mm.

In an advantageous embodiment of the invention, the curvature of the reflector surface in the area near the light source, i.e. in the central area, is stronger than in the remaining area of reflector surface. Preferably, the reflector surface is curved in a parabola.

It should be considered that the uniform light distribution on the front side of the light box is effected primarily by reflection and refraction of the light on the optical film having the above-described surface structure. A light-scattering diffusion plate, as it is usually found in light boxes, is not needed at the front side. While in those light boxes which strictly require a diffusion plate for obtaining relatively uniform light distribution at the back-lit surface, comparatively large losses occur in the diffusion plate, this is not the case in the light box of the invention because here the uniform light distribution is not, or at least not primarily so, effected by a diffusion plate. Accordingly, light sources having low light intensity and thus being less energy-consuming can be used for the light box of the invention. For accomplishing a still more uniform light distribution on the front side, a diffusion plate can be provided also in the light box of the invention.

Depending on the respective use, also arrangement of a liquid-crystal display at the front side of the light box is possible. These display means, for obtaining high-contrast representation over the whole display area, necessitate uniform backlighting which, as explained above, is provided by the light box of the invention. If the light box is to be used as a lamp or a working place luminaire, the front side is provided with an optical film having the same structure as the optical film of the reflector. In this case, the surface structure is arranged on the inner surface of the optical film while the V-shaped grooves can extend both parallel or at right angles to the light source. Such an arrangement of the optical film effects a desired light-orientation. Further, the optical film at the front side of the light box has the advantage that the person working at said working place is not dazzled by the light beams illuminating the working place. Also, the arrangement can be such that the surface structure is arranged on the outer surface of the optical film. In this case, too, the V-shaped grooves can be oriented transverse or parallel to the longitudinal extension of the light source. If the surface structure is provided on the outer surface, the light is subjected to a focussing effect.

In an advantageous embodiment of the invention, there is provided a mounting means having at least one resilient holding element to be plugged onto the light source, the optical film of the reflector having its central portion fastened to said resilient holding element.

By the individual holding elements, the optical film and the light source (fluorescent tube) are interconnected and kept at a distance from each other. Normally, two or three holding elements are required. Due to the resilience of the holding elements, caused by the construction as well as by the material of the holding elements, the holding elements can be easily plugged onto the fluorescent tube and removed therefrom. The holding elements are preferably made from a transparent material, the optical film being bonded to the holding element by a transparent plastic adhesive. By withdrawing the holding elements from the fluorescent tube, the optical film of the reflector can be easily removed, e.g. for being replaced by a new one. Thus, the above-described mounting device for holding the optical film at the fluorescent tube is advantageous particularly with respect to the mounting and maintenance of the light box.

By the above holding element(s), the optical film of the reflector is held attached to the fluorescent tube by said holding elements only in the central area of the optical film, the remaining area thereof being supported on the reflector surface. After the fluorescent tube has been mounted in its tube sockets in the light box, the optical film is firmly secured on the reflector surface. The construction of the holding elements is such that, with the holding element remaining immovable, the fluorescent tube can be rotated about the longitudinal axis thereof.

In a further advantageous embodiment of the invention, the holding element is provided with a resilient clamping member surrounding the fluorescent tube over an angle of more than 180 degrees, preferably up to 270 degrees. This clampingly mountable holding member has formed thereon a radial spacing bar. A supporting bar is attached to the free end of said spacing bar, the optical film being fastened thereto (by bonding). The supporting bar is preferably adapted to the curvature of the reflector in the area close to the light source, i.e. in the central portion. Thus, the optical film, by being fastened to the supporting bar, is given a curvature corresponding to that of the reflector.

An embodiment of the invention will be explained in greater detail hereunder with reference to the accompanying drawings. In the drawings FIG. 1 is a perspective view of the light box with part of the box broken away, FIG. 2 is a sectional view along line II—II of FIG. 1, and FIG. 3 is a sectional view along line III—III of FIG. 1.

FIG. 1 is a perspective view of a light box 10, with the side walls and the back-lit front wall being partially broken away to reveal the interior construction of light box 10. The light box 10 has a parallelepiped case 12 consisting of a rear wall 14, four side walls 16,18 arranged at right angles to each other, and a front wall 20 opposite to rear wall 14. While the rear wall and the side walls of case 12 are made from sheet metal, the front wall 20 consists of a light-pervious plastics material and acts as a light-scattering diffusion plate. The transparent front wall 20 is the back-lit front side 21 of the light box 10. Inside case 12, a reflector 22 is arranged which, as seen in sectional view through light box 10, is arranged as a concavely curved plate having its lowermost portion abutting the rear wall 14. The concave reflector surface 24, being directed to front wall 20, has its surface painted mat white. In the center of light box 10, there is arranged a light source consisting of a fluorescent tube 26 extending in parallel to the longitudinal side walls 16 of case 12 and at a constant distance from side walls 16. (The longitudinal side walls 16 are the longer walls among the four side walls of case 12.)

As shown in the Figures, the reflector surface 24 has its central portion provided with a film 28 which, as evident from FIG. 2, has an even lower surface resting on reflector surface 24 and a structured upper surface facing the fluorescent lamp 26. Said film 28 is a so-called optical film of transparent material, e.g. polycarbonate or polymethylmethacrylate. The surface of the optical film 28 directed towards lamp 26 is provided with a plurality of V-shaped grooves 30 extending over the width of the optical film 28 and being arranged parallel and in direct abutment to each other. Because of the V-shaped section, prisms 32 are formed between neighboring grooves 30. The flanks of the V-shaped grooves 30 or respectively the flanks of the prisms 32 are perpendicular to each other, extending at an angle of 45 degrees to the even surface of the optical film 28. As can be seen in the drawings, the V-shaped grooves 30 or respectively the prisms 32 extend perpendicular to the longitudinal axis of the fluorescent tube 26, i.e. transversely to the longitudinal dimension of the elongated light source of light box 10. By the fact that the optical film is narrower than the reflector 22 and is arranged centered thereto, peripheral portions 34 are generated on the reflector 22. Said peripheral portions 34 are in abutment to the two longitudinal side walls 16 of case 12 and are exposed, i.e. are not provided with the optical film 28. The two peripheral portions 34 are parallel to the fluorescent tube 26 and are mat white.

As indicated in dotted lines in FIG. 1 and shown in greater detail in FIG. 3, the optical film 28 is mounted at the fluorescent tube 26 by a mounting means. In the presently described embodiment, the mounting means consists of three holding elements 36 distributed over the length of the fluorescent tube 26 and fabricated from a resilient transparent material. The holding elements 36 are provided with a clamping member of C-shaped section, enclosing the fluorescent tube 26 over a sector of more than 180 degrees, preferably up to 270 degrees. The clamping member is a cylindrical sleeve 38 which, in one circumfertial portion thereof, has a gap 39 extending axially over the length of said sleeve. Through this gap 39, sleeve 38 is shifted onto the fluorescent tube 26. With the sleeve 38 being mounted on the fluorescent tube 26, the sleeve 38 is spread, thus exerting a clamping force on fluorescent tube 26. In this manner, the holding element 36 is secured on the fluorescent tube 26.

The sleeve 38 has a spacing bar 40 formed thereon, being arranged diametrically opposite to gap 39 and extending radially to sleeve 38. The radial orientation of said spacing bar 40 determines the distance between the optical film 28 and the fluorescent tube 26. The free end of spacing bar 40, being averted from sleeve 38, is joined by a supporting bar 42 which extends transverse to spacing bar 40 and, in the range of the fluorescent tube 26, is adapted to the curvature of reflector 22 and has the optical film 28 attached thereto by a transparent adhesive 44 (cf. FIG. 2). The optical film 28 lies on the reflector surface 24 of the reflector and is maintained in its position exclusively by the holding elements 36 plugged onto the fluorescent tube 26. The fluorescent tube 26, in turn, is mounted within case 12 by the sockets at the ends of tube 26 (the sockets being omitted in the Figures for reasons of clarity).

Further, it should be mentioned that, in the Figures, the thickness of the optical film and the surface structure thereof are not represented in their real dimensions with respect to the other parts of the light box since, if the Figures were true to scale, the optical film would not be visible anymore. While the light box has a width of about 40 cm, a length of 70 cm and a height of about 7 cm, the optical film has a thickness of about 0.5 mm, the height of the prisms 32 (or the depth of the grooves 30) being about 0.17 mm and the distance of adjacent prisms being about 0.35 mm. The fluorescent tube 26 is arranged at a distance of about 5 mm to the optical film 28; for the better understanding of the invention, also this aspect is not shown in correct scale in the Figures.

Following the above description of the construction of the light box, the functional principle thereof will be explained hereunder.

The front side 21 of light box 10 has placed thereon, e.g. a back-lit poster or a photograph arranged on the transparent front wall 20 of case 12. The front wall 20 is back-lit by the light of the fluorescent tube 26. Illumination of the front wall 20 is effected, on the one hand, by light beams emitted from the upper portion of fluorescent tube 26 and incident directly onto the inner side of front wall 20. On the other hand, however, illumination of the front wall 20 is also effected by light emitted from the lower portion, i.e. the lower half of fluorescent tube 26, and being reflected by the optical film 28 or by the exposed strips of the peripheral portions 34 of the reflector towards the front wall 20. The light beams impinging on optical film 28 are either reflected by the flanks of the V-shaped grooves 30 and prisms 32 or, being refracted, penetrate into the optical film 28 and are diffusely reflected by the underlying reflector surface 24 of reflector 22 and, after penetrating the optical film 28 repeatedly or undergoing multiple reflection within the optical film, exit in the direction of front wall 20. In the exposed peripheral portions 34 of the reflector area, reflection is diffuse because the entire reflector surface 24 is mat white. Due to said diffuse reflection in the peripheral portions 34 of reflector 22, a scattering of the impinging light occurs in these areas, resulting in a more uniform light distribution in the area of the longitudinal edges of front wall 20. Moreover, by the V-shaped grooves 30 and prisms 32 on the surface of the optical film 28 facing the fluorescent tube 26 in the immediate vicinity thereof, it is provided that the light beams are for the largest part reflected past the fluorescent tube 26 towards the front wall 20. Other than is the case with an even reflector surface, those light beams which are reflected in the immediate vicinity of fluorescent tube 26 do not penetrate the fluorescent tube 26 and, therefore, do not add to the portion of light emitted directly from the fluorescent tube 26 towards the front wall. Instead, those light beams which are reflected due to the structured shape of the surface of optical film 28 in the area of the fluorescent tube 26 contribute to an additional illumination of areas immediately near the fluorescent tube 26. As a result, illumination of the central area of front wall 20 is more uniform.

Due to the geometry of the fluorescent tube 26, the light beams exit at different distances to the reflector 22 or, respectively to the optical film 28. Thus, the light beams impinge at substantially equal angles of incidence in wide areas of reflector 22 or, resp. optical film 28 so that substantially equal reflections are obtained. Also this effect adds to a still more uniform illumination of the front wall 20. In conclusion, it should be noted that due to the optical film 28 having V-shaped grooves 30 and prisms 32 extending transverse to the longitudinal dimension of fluorescent tube 26, uniform light distribution is accomplished within the box 10 between the reflector 22 and the front wall 20 to be back-lit. Therefore, the uniform illumination of the front side of the light box need not be "paid for" by a diffusion plate to be arranged in that location. As commonly known, diffusion plates cause losses of light, necessitating the use of more powerful light sources for obtaining a desired luminance in the back-lit front side area. The light box as described here and shown in the Figures can be evenly illuminated by a 25 Watt fluorescent tube without identifiable variations in luminance on the front side 21 of light box 10.

What is claimed is:

1. Light box comprising
   a case having a front side to be backlit,
   an elongated light source for backlighting the front side and
   a reflector with a curved reflector surface and having a central portion, said reflector having provided thereon an optical film of a light-transmissive material, said optical film having a surface directed towards the light source, said surface of said optical film being provided with substantially V-shaped grooves arranged side by side and in parallel to each other,
   characterized in
   that the elongated light source is arranged in the central portion of the reflector and
   that the V-shaped grooves extend transverse to the extension of the light source.

2. Light box according to claim 1, characterized in that the curved reflector surface generates diffuse reflection.

3. Light box according to claim 2, characterized in that the optical film is arranged centrally in an area of the curved reflector surface near the light elongated source and that the two exposed peripheral portions of the curved reflector surface, being parallel to a longitudinal extension of the elongated light source, are provided for diffuse reflection of the light of the elongated light source.

4. Light box according to claim 3, characterized in that the curved reflector surface is a mat white surface.

5. Light box according to claim 4, characterized in that the curvature of the curved reflector surface in said central area near the elongated light source is stronger than in the remaining area of the curved reflector surface.

6. Light box according to claim 5, characterized in that the elongated light source is arranged in the immediate vicinity of the optical film.

7. Light box according to claim 6, characterized in that the elongated light source is a fluorescent tube.

8. Light box according to claim 7, characterized in that the optical film consists of a material selected from a group consisting of polycarbonate or polymethylmethacrylate.

9. Light box according to claim 7, characterized in that the optical film of the reflector is in abutment to the curved reflector surface and has a central area, said central area of said optical film being fastened to the fluorescent tube by at least one resilient holding element.

10. Light box according to claim 1, characterized in that the front side is provided with a diffusion plate.

11. Light box according to claim 1, characterized in that a mounting means is provided, having at least one resilient holding element to be plugged onto the elongated light source and having the optical film of the reflector fastened thereto.

12. Light box according to claim 11, characterized in that the at least one resilient holding element is provided with a resilient clamping member surrounding the elongated light source over an angle of more than 180 degrees of the circumference thereof and having formed thereon a spacing bar, a supporting bar being attached to a free end of said spacing bar and having the optical film fastened thereto.

13. Light box according to claim 11, characterized in that the optical film is bonded to said at least one resilient holding element by a transparent adhesive.

* * * * *

UNITED STATES PATENT AND TRADEMARK OFFICE
CERTIFICATE OF CORRECTION

PATENT NO.   : 5,224,770
DATED        : Jul. 6, 1993
INVENTOR(S)  : Simmons et al.

It is certified that error appears in the above-indentified patent and that said Letters Patent is hereby corrected as shown below:

Col. 7, line 41, Replace "light elongated" with —elongated light—

Signed and Sealed this

Third Day of January, 1995

Attest:

BRUCE LEHMAN

Attesting Officer

Commissioner of Patents and Trademarks